United States Patent [19]
Seiter et al.

[11] Patent Number: 4,661,281
[45] Date of Patent: Apr. 28, 1987

[54] PROCESS FOR THE PRODUCTION OF A SPRAY-DRIED NONIONIC WASHING AID

[75] Inventors: Wolfgang Seiter, Neuss; Ingo Wegener, Duesseldorf; Herbert Reuter, Hilden, all of Fed. Rep. of Germany

[73] Assignee: Henkel Kommanditgesellschaft auf Aktien, Duesseldorf, Fed. Rep. of Germany

[21] Appl. No.: 750,807

[22] Filed: Jun. 28, 1985

[30] Foreign Application Priority Data

Jul. 2, 1984 [DE] Fed. Rep. of Germany ....... 3424299

[51] Int. Cl.[4] ........................ B01J 2/04; C11D 3/075; C11D 11/02; C11D 17/06

[52] U.S. Cl. .................................... 252/140; 252/109; 252/135; 252/156; 252/174; 252/174.16; 252/174.21; 252/174.22; 252/174.25; 252/DIG. 1; 252/DIG. 17; 159/4.04

[58] Field of Search ........... 252/135, 140, 174, 174.21, 252/174.25

[56] References Cited

U.S. PATENT DOCUMENTS

| | | | |
|---|---|---|---|
| 2,550,691 | 5/1951 | Harris | 252/140 |
| 3,741,913 | 6/1973 | Waag | 252/544 |
| 3,838,072 | 9/1974 | Smith et al. | 252/540 |
| 3,849,327 | 11/1974 | DiSalvo et al. | 252/109 |
| 3,886,098 | 5/1975 | DiSalvo et al. | 252/540 |
| 3,926,827 | 12/1975 | Mangeli | 252/99 |
| 4,064,063 | 12/1977 | Alder et al. | 252/135 |
| 4,216,125 | 8/1980 | Campbell et al. | 252/527 |
| 4,269,722 | 5/1981 | Joshi et al. | 252/90 |
| 4,274,974 | 6/1981 | Kerkhoven | 252/90 |
| 4,308,158 | 12/1981 | Gohla | 252/97 |

FOREIGN PATENT DOCUMENTS

| | | |
|---|---|---|
| 1098132 | 1/1961 | Fed. Rep. of Germany . |
| 1792434 | 11/1971 | Fed. Rep. of Germany . |
| 2418294 | 10/1975 | Fed. Rep. of Germany . |
| 2837504 | 3/1980 | Fed. Rep. of Germany . |
| 1232009 | 5/1971 | United Kingdom . |

OTHER PUBLICATIONS

Layman, Patricia L., "For Detergent Producers, the Question is, Which?" Chemical Week, Jul. 23, 1980.

*Primary Examiner*—Paul Lieberman
*Assistant Examiner*—L. Skaling
*Attorney, Agent, or Firm*—Ernest G. Szoke; Henry E. Millson, Jr.; Real J. Grandmaison

[57] ABSTRACT

A free-flowing washing powder of low specific gravity (powder density 300 to 500 g/l) and containing large quantities of nonionic surfactants is produced by spray-drying an aqueous suspension containing on the spray-dried basis (A) from 15 to 30% by weight of nonionic tensides, (B) from 8 to 18% by weight of sodium silicate, (C) from 25 to 55% by weight of finely crystalline zeolite, (D) from 0 to 25% by weight of sodium tripolyphosphate, (E) no more than 3% by weight of soap and synthetic anionic tensides, and from 35 to 50% by weight of water. The suspension, which has a temperature of from 75° C. to 90° C., is sprayed through nozzles into a drying zone under a pressure of from 35 to 100 bar. The drying gas flowing in countercurrent has an entry temperature of from 160° C. to 240° C. and an exit temperature of from 80° C. to 95° C. The spray-dried product contains from 9 to 16% by weight of water which is removable at a drying temperature of 130° C.

19 Claims, No Drawings

PROCESS FOR THE PRODUCTION OF A SPRAY-DRIED NONIONIC WASHING AID

BACKGROUND OF THE INVENTION

The present invention relates to a process for the production of a spray-dried, pourable washing aid containing nonionic tensides of the ethoxylated alcohol type and having a powder density of from 300 g/l to 550 g/l.

Washing aids are products which, on their own, are unable to satisfy all the demands made of a heavy-duty detergent, but which may be incorporated as additives in ready-made detergents or used as detergency boosters in conventional washing processes to enable special washing problems to be more effectively solved. Nonionic tensides or surface-active agents have proved to be effective detergency boosters, particularly for removing obstinate stains.

Normally, modern detergents already contain nonionic tensides in quantities of from 3 to 20% by weight. However, the view generally held among experts is that detergents of low specific gravity, i.e. with a powder density of less than 600 g/l, which contain more than 8 to 10% by weight of these generally liquid to semi-solid, more or less tacky nonionic tensides cannot be satisfactorily produced by spray drying of aqueous concentrates (slurries). Although German Published Application DE-AS No. 17 92 434 to Coffey et al., corresponding to British patent GB-PS No. 1,232,009 to Coffey et al., describes a process for producing granular detergents containing from 5 to 20% of nonionic tensides by spray drying of an aqueous slurry, the detergents in question contain from 25 to 60% and, according to the Examples, from 40 to 52% of tripolyphosphate, a phosphate content which is now regarded as unreasonably high. In addition, the production process is complicated by the fact that the tripolyphosphate used for preparing the slurry has to be partially prehydrated beforehand. In spite of this, it is not possible in practice to incorporate much more than 15% by weight of nonionic tensides in the powder so long as importance is attributed to adequate fluidity of the powder particles. In addition, there were serious objections to the spray drying of powders of high tenside, particularly nonionic tenside, content on account of the danger of dust explosions and intense pluming caused by nonionic material entrained in the off-gases of the spray towers. For this reason, the relevant specialist and patent literature warns against processing mixtures such as these of high tenside content in hot spray towers and, instead, proposes applying relatively high percentages of nonionic tenside to preformed carrier particles by spray granulation.

Thus, in the process according to DE-AS No. 10 98 132 to Pfrengle et al., for example, the nonionic tenside is sprayed in a proportion of up to 60% onto a spray-dried and, therefore, particularly adsorbent sodium tripolyphosphate, resulting in the formation of a granulate having a powder density of less than 550 g/l. However, since the end product contains more than 30% by weight and preferably more than 40% by weight of phosphate, it no longer complies with the requirements which an environmentally acceptable product can be expected to satisfy.

Similar processes are described in U.S. Pat. Nos. 3,838,072 to Smith, et al., 3,849,327 to DiSalvo, et al.I, 3,886,098 to DiSalvo, et al.II, and 3,926,827 to Mangeli. A granular carrier material is prepared by spray drying of a slurry containing sulfonate tensides, soap and large quantities of inorganic salts acting as carrier material, such as sulfates, silicates and phosphates, and is subsequently sprayed with nonionic tenside in a mixer. It is said to be possible in this way to produce powders having a powder density of from 300 to 800 g/l and a nonionic tenside content of up to 25% by weight. In order with such a high nonionic tenside content as this to prevent the granules from sticking to one another, the granules have to be aftertreated (powdered) with an adsorbent, such as silica (Aerogel ®) or carboxymethyl cellulose. A 3-stage production process such as this is relatively complicated.

In addition, detergents having a powder density of at least 500 g/l, which consist of substantially spherical particles of a certain size and which are apparently capable of adsorbing up to 30% by weight of nonionic tensides, are known from U.S. Pat. No. 4,269,722 to Joshi, et al. In this case, too, a highly adsorbent carrier grain has to be prepared beforehand by a special spraying process and subsequently treated in a mixer with the nonionic tenside. These products are also rich in phosphate and relatively expensive on account of the several stages involved in their production.

Another disadvantage of the multistage processes generally known as "spray mixing processes" lies in the fact that the preformed carrier grains undergo a certain degree of abrasion during their subsequent treatment with nonionic tenside in a mixer, resulting in the formation of fines. In addition, the nonionic tensides are capable, by virtue of their tacky properties, of cementing granules together to form relatively large agglomerates. Accordingly, the material being treated changes its grain spectrum, which is frequently undesirable and necessitates an additional sifting process.

In addition, it is known from DE-OS No. 24 18 294 to Saran, et al., and from DE-PS No. 2 837 504 to Kubersky, et al., that nonionic tenside mixtures having a special composition and nonionic tensides having a special constitution can be sprayed onto a water-soluble carrier salt, more particularly perborate, and that the granulate obtained may be subsequently incorporated in a ready-made washing powder. In these cases, however, special nonionic compounds have to be used within restricted prototype formulations. In addition, it is difficult to produce pourable granulates containing more than 15% by weight of nonionic tenside.

OBJECTS OF THE INVENTION

An object of the present invention is the development of a simple spray-drying process for the production of a spray-dried, pourable washing aid containing nonionic tensides of the ethoxylated alcohol type and having a powder density of from 300 g/l to 550 g/l, which washing aid is free-flowing and adequately water soluble.

Another object of the present invention is the development of a process for the production of a spray-dried, pourable washing aid containing nonionic tensides of the ethoxylated alcohol type and having a powder density of from 300 g/l to 550 g/l comprising the steps of (1) spraying an aqueous suspension of from 50 to 65 parts by weight of constituents of the following composition where all percentages, based on anhydrous constituents, are percent by weight of the spray-dried product:

(A) from 15 to 30% by weight of at least one nonionic tenside of the ethoxylated alcohol type, (B) from 8 to 18% by weight of sodium silicate having the composition $Na_2O:SiO_2$ of 1:1.5 to 1:3.4, (C) from 25 to 55% by weight of finely crystalline, synthetic zeolite selected from the group consisting of zeolite NaA, zeolite NaX and mixtures thereof, (D) from 0 to 25% by weight of pentasodium tripolyphosphate, and (E) from 0 to 3% by weight of anionic surface-active compounds selected from the group consisting of soaps, sulfonates and sulfates, in from 35 to 50 parts by weight of water at a temperature of 75° to 90° C. through nozzles under a pressure of from 35 to 100 bar into a spray-drying zone in which the drying gas flowing in countercurrent has an entry temperature of from 160° to 240° C. and an exit temperature of from 80° to 95° C., and (2) recovering a spray-dried product containing from 13 to 21% by weight of water, of which water from 9 to 16% by weight is removable on heating said spray-dried product to 130° C.

These and other objects of the invention will become more apparent as the description thereof proceeds.

DESCRIPTION OF THE INVENTION

The present invention avoids the disadvantages of the above-discussed prior art and relates to a process for producing a spray-dried, pourable washing aid containing nonionic tensides of the ethoxylated alcohol type and having a powder density of from 300 g/l to 550 g/l, characterized in that an aqueous suspension of from 50 to 65 parts by weight of water-free constituents of the following composition:

(A) from 15 to 30% by weight of nonionic tenside of the ethoxylated alcohol type, (B) from 8 to 18% by weight of sodium silicate having the composition $Na_2O:SiO_2=1:2$ to 1:3.4, (C) from 25 to 55% by weight of finely crystalline, synthetic zeolite of the NaA and/or NaX type, (D) from 0 to 25% by weight of pentasodium tripolyphosphate, and (E) no more than 3% by weight of an anionic surface-active compound from the group comprising soaps, sulfonates and sulfates, in from 35 to 50 parts by weight of water at 75° to 90° C. is sprayed through nozzles under a pressure of from 35 to 100 bar into a spray-drying tower in which the drying gas flowing in countercurrent has an entry temperature of from 160° to 240° C. and an exit temperature of from 80° to 95° C., the spray-dried product leaving the tower containing from 9 to 16% by weight of water which can be removed at 130° C.

More particularly, the present invention relates to a process for the production of a spray-dried, pourable washing aid containing nonionic tensides of the ethoxylated alcohol type and having a powder density of from 300 g/l to 550 g/l comprising the steps of (1) spraying an aqueous suspension of from 50 to 65 parts by weight of constituents of the following composition where all percentages are percent by weight of the spray-dried product:

(A) from 15 to 30% by weight of at least one nonionic tenside of the ethoxylated alcohol type, (B) from 8 to 18% by weight of sodium silicate having the composition $Na_2O:SiO_2$ of 1:1.5 to 1:3.4, (C) from 25 to 55% by weight of finely crystalline, synthetic zeolite selected from the group consisting of zeolite NaA, zeolite NaX and mixtures thereof, (D) from 0 to 25% by weight of pentasodium tripolyphosphate, and (E) from 0 to 3% by weight of anionic surface-active compounds selected from the group consisting of soaps, sulfonates and sulfates, in from 35 to 50 parts by weight of water at a temperature of 75° to 90° C. through nozzles under a pressure of from 35 to 100 bar into a spray-drying zone in which the drying gas flowing in countercurrent has an entry temperature of from 160° to 240° C. and an exit temperature of from 80° to 95° C., and (2) recovering a spray-dried product containing from 13 to 21% by weight of water, of which water from 9 to 16% by weight is removable on heating said spray-dried product to 130° C.

The aqueous suspension subjected to spray-drying is preferably one in which the constituents have the following composition, based on the spray-dried product:

from 18 to 28% by weight of component A,
from 9 to 16% by weight of component B,
from 28 to 45% by weight of component C,
from 8 to 20% by weight of component D,
from 0 to 2% by weight of anionic tensides from the group comprising soaps, sulfonates and sulfates.

In one particularly preferred embodiment, the constituents have the following composition:

from 20 to 25% by weight of component A,
from 10 to 15% by weight of component B,
from 30 to 40% by weight of component C,
from 10 to 17% by weight of component D,
from 0.1 to 2% by weight of soap.

Suitable nonionic tensides (component A) are ethoxylated alcohols where the alcohols are alkanols and/or alkenols containing from 12 to 24 and preferably from 14 to 18 carbon atoms and, on average, from 3 to 20 and preferably from 4 to 16 glycol ether groups. The hydrocarbon residues may be saturated (alkyl) or monounsaturated (alkenyl), linear or even methyl-branched in the 2-position (oxo residue) and may be derived, for example, from naturally occurring or hydrogenated fatty residues and/or synthetic residues. Ethoxylates derived from cetyl, stearyl and oleyl alcohol and mixtures thereof have proved to be particularly suitable. Examples include tallow fatty alcohol containing on average from 4 to 8 ethylene oxide groups (EO), tallow fatty alchol containing on average from 10 to 18 EO and oleyl alcohol containing on average from 6 to 12 EO, and mixtures thereof. Mixtures of 2 or more tensides of different EO-content, in which the more highly ethoxylated alcohols predominate, have proved to be particularly advantageous because their tendency towards pluming in the off-gases is negligible and because their detergency with respect to mineral and greasy stains is particularly pronounced.

Examples of mixtures such as these are mixtures of (a) tallow alcohol containing from 4 to 6 EO, (b) tallow alcohol containing from 12 to 16 EO, (c) commercial oleyl alcohol (i.e. mixtures of oleyl and stearyl alcohol) containing from 6 to 12 EO, for example in a ratio of a to b of from 2:1 to 1:4 and in a ratio of a to b to c of from 2:1:1 to 2:1:4 or from 1:1:1 to 1:4:1.

The ethoxylated alcohols mentioned above may also be completely or partly replaced by ethoxylated alkyl phenols containing from 8 to 12 carbon atoms in the alkyl group and from 5 to 12 EO-groups, although it is preferred to use the ethoxylated alcohols.

Component B consists of sodium silicate having the composition $Na_2O:SiO_2=1:1.5$ to 3.4, preferably 1:2 to 1:3.4, more particularly 1:2 to 1:2.5. It is also possible to use mixtures of silicates differing in their alkali content, for example a 1:2 and 1:2.5–3 mixture of $Na_2O:SiO_2$, although the proportion of silicates of relatively high $Na_2O$-content should best predominate in the interests of a high powder density.

Component C is a synthetic sodium aluminosilicate containing bound water of the zeolite A or zeolite X type. It is used in the usual hydrated, finely crystalline form, i.e. it contains virtually no particles larger than 30 microns and preferably consists to a level of at least 80% of particles smaller than 10 microns in size. Its calcium binding power, as determined by the method described in DE No. 24 12 837, corresponding to Ser. No. 330,593, filed Dec. 14, 1981, amounts to between 100 and 200 mg CaO/g. Zeolite NaA is particularly suitable, although zeolite NaX and mixtures of NaA and NaX may also be used.

The washing aids according to the invention may be free from phosphates. However, if a small phosphate content is harmless or acceptable, sodium tripolyphosphate (component D) may be incorporated in the slurry in quantities of no more than 25% by weight, preferably in quantities of no more than 20% by weight and, more preferably, in quantities of no more than 17% by weight, based in each case on the spray-dried product. The addition of sodium tripolyphosphate produces a certain improvement in the free-flow properties of the spray-dried powder and in the rate at which it dissolves in cold water. Since the washing aids produced in accordance with the invention are not detergents as such, but instead detergency-boosting additives to detergents, the phosphate content is reduced even further for practical application, particularly in cases where a phosphate-free preparation is used as a further detergent component.

The washing aids according to the invention should contain less than 3% and preferably no more than 2% of soap and synthetic anionic tensides, i.e. those of the sulfonate or sulfate type, particularly alkylbenzene sulfonates. Their soap content may be between 0.1 and 2% by weight. Larger amounts of snythetic anionic tensides should not be used because it has been found that they lead to a deterioration in the free-flow properties.

In one preferred embodiment, hydroxyalkane polyphosphonic acids corresponding to the following formulae

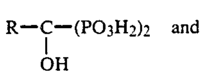 and 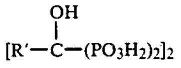

in which R is an alkyl radical and R' an alkenyl radical containing from 1 to 4 carbon atoms, are added to the slurry in quantities of from 0.1 to 3% by weight and more particularly in quantities of from 0.3 to 2% by weight, based on the spray-dried constituents, as the alkali-metal salt. The sodium salt of 1-hydroxyethane-1,1-diphosphonic acid is preferably used. The phosphonic acids counteract thermal decomposition of the nonionic tensides during the spray-drying process and reduce the tendency towards pluming in the off-gases and towards yellowing and browning of the spray-dried powder in cases where it accumulates on the inner wall of the spray-drying tower. In addition, they increase the rate at which the powder dissolves in cold water.

In another preferred embodiment from 0.1 up to 2% by weight, based on anhydrous constituents, of sodium hydroxide in the form of caustic soda is additionally incorporated in the aqueous concentrate to improve the processibility of the slurry and the solubility of the spray-dried product in cold water. Additions of from 0.5 to 1.5% by weight of sodium hydroxide have proved to be particularly effective. However, if a more alkaline sodium silicate (component B), for example of the composition $Na_2O:SiO_2=1:2$, is used, the addition of sodium hydroxide may be reduced or even omitted altogether.

The concentration of the slurry is adjusted in such a way that for 50 to 65 parts by weight and preferably for 55 to 63 parts by weight of water-free constituents there are 50 to 35 parts by weight and preferably 45 to 37 parts by weight of water. The spray drying process is controlled in such a way that the spray-dried product contains from 13 to 21% by weight of water; and from 9 to 16% by weight and preferably from 10 to 15% by weight of water which is removable by drying (under atmospheric pressure) at 130° C.

In the interests of ready processibility, particularly where the small amounts of soap mentioned above are used, the slurry to be spray-dried has a temperature of from 60° to 70° C. and preferably from 62° to 68° C. To prevent the nonionic tensides from separating, it is advisable to mix the slurry until just before it is fed into the spray nozzles. The slurry is sprayed by means of conventional nozzles, which are generally designed as spin nozzles, under a pressure of from 35 to 100 bar and preferably under a pressure of from 40 to 65 bar. The nozzle orifice normally has a diameter of from 3 to 5 mm.

The drying gas flowing in countercurrent to the sprayed material has an entry temperature of from 160° to 240° C. and preferably from 170° to 220° C., this temperature being measured in the so-called annular duct, i.e. in the entry zone immediately preceding the lower tower feed pipes. The exit temperature of the drying gas is in the range from 80° to 95° C. Higher entry temperatures result in the formation of deposits on the walls of the tower and in browning of the powder deposits. Higher exit temperatures promote undesirable pluming in the off-gases.

The following examples are illustrative of the practice of the invention without being limitative in any respect.

EXAMPLES

The composition of the various spray-dried washing aids is shown in Table I. The abbreviations and other symbols used have the following meanings:

TA/14EO: tallow alcohol + 14 mols of ethylene oxide

TA/5EO: tallow alcohol + 5 mols of ethylene oxide

OT/9EO: oleyl/tallow alcohol (iodine value 50) + 9 mols of ethylene oxide soap: Na tallow soap TPP: sodium tripolyphosphate Z-NaA: zeolite of the NaA type, particle size <10 u Na-Si: sodium silicate ($Na_2O:SiO_2=1:3.3$)

HEDP: hydroxyethanediphosphonate (Na salt)

$H_2O$ (I): total water content a spray-drying $H_2O$ (II): water removable at 130° C.

The constituents were mixed to form an aqueous suspension having a total water content of 57% by weight. 92% of the tripolyphosphate was present in the II modification. The zeolite was used in the form of a stable aqueous master batch containing 52.1% by weight of water, the sodium hydroxide was used in the form of 50% caustic soda.

The suspensions having a temperature of 67° to 68° C. were homogenized and sprayed through atomizing nozzles into a spray-drying tower which was operated in countercurrent. The entry temperature of the combustion gases used for drying, as measured in the annular duct, was 170° to 175° C. and the temperature of the off-gases as measured before the tower exit was 81.5° to 83.5° C. Some of the off-gases were branched off to determine the degree of pluming using a nephelometer and also the quantity of gaseous decomposition products formed (from oxidatively decomposed nonionic tensides) by gas chromtography. The degree of decomposition is reflected in the different level of a peak of which the height above the base value is expressed hereinafter in cm. The degree of pluming is expressed in scale units of the nephelometer, increasing pluming being characterized by higher figures.

The spray-dried powders had a uniform grain spectrum. The average grain size was 0.8 mm. The fraction larger than 1.6 mm amounted to between 0.5 to 1% by weight and the percentage of fines (particle size below 0.1 mm) to less than 0.5% by weight. In comparison test C, however, it amounted to 0.9% by weight. The powder density of the washing aids was between 450 g/l and 500 g/l.

Pourability was determined by the so-called packet test. In this test, packets made of paper carton material are uniformly filled with the product to the normal filling level, closed by means of a fit-on cover and compressed by measured blows under defined conditions in a motor-driven shaking machine, resulting in reproducible compression of the contents. The packet is opened and fixed in an apparatus which enables the contents to be poured out at defined tilting angles. In addition, the packets may be shaken by means of a motor-driven beater. The amount of powder flowing out is collected in a measuring cylinder. The following marks are awarded, the angles quoted representing the position of the packet:

| | | |
|---|---|---|
| Mark 1 120° | | packet empty |
| Mark 2 120°-140° | | packet empty |
| Mark 3 140°-220° | | packet empty |
| Mark 4 220° | 5 blows | packet empty |
| Mark 5 220° | 10 blows | packet empty |
| Mark 6 220° | 40 blows | packet not empty |

The consumer regards marks of 1 to 3 as very good to good, a mark of 4 as satisfactory and marks of 5 and 6 as poor and unsatisfactory, respectively.

Solubility was determined as follows:

In a glass beaker (capacity 500 cm), 200 ml of tapwater (15° German hardness) tempered to 30° C. are stirred at a constant speed of 700 r.p.m. by means of a motor-driven stirrer comprising 4 stirrer blades bent downwards at an angle of 30°. The distance between the stirrer blades and the bottom of the beaker is 2.5 cm. 1 g of the sample is shaken carefully into the cone formed by stirring, avoiding the formation of any lumps. After 90 seconds, the solution is poured through a tared sieve (mesh width 0.1 mm, diameter 7 cm) and drawn off by means of a suction bottle. Any residues of substance remaining in the glass beaker are transferred to the sieve using as little spraying water as possible. After drying in air for 24 hours, the sieve is reweighed. Marks of 1 to 6 are awarded for the degree of residue formation, a mark of 4 denoting adequate solubility in practice, i.e. no residues are formed in the washed, unrinsed laundry. A mark of 6 means that discernible deposits can accumulate on the unrinsed washing in practice under low temperature washing conditions. The results are shown in Table II. As in Table I, the Examples falling within the scope of the invention are identified by numbers and the Comparison Examples by letters.

The tests show that, with increasing content of sodium silicate, pluming and the tendency towards decomposition of the nonionic tensides decrease considerably. Also, the free-flow properties of the powder improve within the claimed range. Although a reduction in solubility is also observed with increasing sodium silicate content, solubility remains acceptable under practical conditions. This applies in particular when the washing aids according to the invention are mixed with other powder-form detergent ingredients acting as an additional dispersant. However, the comparison product C, which does not fall within the scope of the invention, shows inadequate solubility and an above-average dust content and is thus less suitable.

TABLE I

| | Examples | | | | | | | |
|---|---|---|---|---|---|---|---|---|
| Constituent | A | B | 1 | 2 | 3 | 4 | 5 | C |
| TA/14EO | 3.0 | 3.0 | 3.0 | 3.0 | 3.0 | 3.0 | 3.0 | 3.0 |
| TA/5EO | 8.0 | 8.0 | 8.0 | 8.0 | 8.0 | 8.0 | 8.0 | 8.0 |
| OT/9EO | 13.0 | 13.0 | 13.0 | 13.0 | 13.0 | 13.0 | 13.0 | 13.0 |
| Soap | 2.0 | 2.0 | 2.0 | 2.0 | 2.0 | 2.0 | 2.0 | 2.0 |
| TPP | 14.0 | 14.0 | 14.0 | 14.0 | 14.0 | 14.0 | 14.0 | 14.0 |
| Z—NaA | 42.0 | 39.0 | 37.0 | 35.0 | 33.0 | 30.0 | 30.0 | 25.0 |
| Na—Si | 3.0 | 6.0 | 8.0 | 10.0 | 12.0 | 14.0 | 15.0 | 20.0 |
| Na—OH | 0.3 | 0.3 | 0.3 | 0.3 | 0.3 | 0.3 | 0.3 | 0.3 |
| HEDP | — | — | — | — | — | 1.0 | — | — |
| $H_2O$ (I) | 14.7 | 14.7 | 14.7 | 14.7 | 14.7 | 14.7 | 14.7 | 14.7 |
| $H_2O$ (II) | 9.5 | 9.8 | 10.4 | 9.7 | 10.0 | 9.8 | 10.1 | 10.5 |

TABLE II

| Example | Pluming | Decomposition | Pourability | Solubility |
|---|---|---|---|---|
| A | 0.5 | 15 | 5 | 3 |
| B | 0.4 | 14 | 4 | 3–4 |
| 1 | 0.2 | 8 | 3 | 4 |
| 2 | 0.2 | 6 | 3 | 4 |
| 3 | 0.1 | 3 | 2 | 4 |
| 4 | 0.1 | 1 | 2 | 4–5 |
| 5 | 0.1 | 2 | 2 | 5 |
| C | 0.1 | 2 | 3 | 6 |

The preceding specific embodiments are illustrative of the practice of the invention. It is to be indicated however, that other embodiments known to those skilled in the art or disclosed herein, may be employed without departing from the spirit of the invention or the scope of the appended claims.

We claim:

1. A process for the production of a spray-dried, pourable washing aid containing nonionic surface-active agents of the ethoxylated alcohol type and having a powder density of from 300 g/l to 550 g/l, comprising the steps of (1) spraying an aqueous suspension of from 50 to 65 parts by weight of constituents of the following composition where all percentages, based on anhydrous constituents, are percent by weight of the spray-dried product:

(A) from 15 to 30% by weight of at least one nonionic surface-active agent of the ethoxylated alcohol type;

(B) from 8 to 18% by weight of sodium silicate having the composition $Na_2O:SiO_2$ of 1:1.5 to 1:3.4;

(C) from 25 to 55% by weight of finely crystalline, synthetic zeolite selected from the group consisting of zeolite NaA, zeolite NaX and mixtures thereof;

(D) from 8 to 20% by weight of pentasodium tripolyphosphate; and (E) from 0 to 3% by weight of anionic surface-active compounds selected from the group consisting of soaps, sulfonates and sulfates, in from 35 to 50 parts by weight of water at a temperature of 75° to 90° C. through nozzles under a pressure of from 35 to 100 bar into a spray-drying zone in which the drying gas flowing in countercurrent has an entry temperature of from 160° to 240° C. and an exit temperature of from 80° to 95° C.; and (2) recovering a spray-dried product containing from 13 to 21% by weight of water, of which water from 9 to 16% by weight is removable on heating said spray-dried product at 130° C.

2. The process of claim 1 wherein said aqueous suspension comprises the following composition where all percentages are percent by weight of the spray-dried product:

from 18 to 28% by weight of component A,
from 9 to 16% by weight of component B,
from 28 to 45% by weight of component C,
from 8 to 20% by weight of component D, and
from 0 to 2% by weight of component E.

3. The process of claim 1, wherein said aqueous suspension comprises the following composition where all percentages are percent by weight of the spray-dried product:

from 20 to 25% by weight of component A,
from 10 to 15% by weight of component B,
from 30 to 40% by weight of component C,
from 10 to 17% by weight of component D,
from 0.1 to 2% by weight of soap, as component E.

4. The process of claim 1, wherein said aqueous suspension contains from 0.1 to 3% by weight, based on the spray-dried product, of a hydroxyalkanepolyphosphonic acid in the form of its alkali-metal salt.

5. The process of claim 4, wherein said hydroxyalkanepolyphosphonic acid is present in an amount of from 0.3 to 2% by weight.

6. The process of claim 2, wherien said aqueous suspension contains from 0.1 to 3% by weight, based on the spray-dried product, of a hydroxyalkanepolyphosphonic acid in the form of its alkali-metal salt.

7. The process of claim 6, wherein said hydroxyalkanepolyphosphonic acid is present in an amount of from 0.3 to 2% by weight.

8. The process of claim 3, wherein said aqueous suspension contains from 0.1 to 3% by weight, based on the spray-dried product, of a hydroxyalkanepolyphosphonic acid in the form of its alkali-metal salt.

9. The process of claim 8, wherein said hydroxyalkanepolyphosphonic acid is present in an amount of from 0.3 to 2% by weight.

10. The process of claim 1, wherein said aqueous suspension contains from 0.1 to 2% by weight, based on the spray-dried product of sodium hydroxide.

11. The process of claim 2, wherein said aqueous suspension contains from 0.1 to 2% by weight, based on the spray-dried product of sodium hydroxide.

12. The process of claim 3, wherein said aqueous suspension contains from 0.1 to 2% by weight, based on the spray-dried product of sodium hydroxide.

13. The process of claim 5, wherein said aqueous suspension contains from 0.1 to 2% by weight, based on the spray-dried product of sodium hydroxide.

14. The process of claim 1, wherein said aqueous suspension contains from 55 to 63 parts by weight of said constituents and from 45 to 37 parts by weight of water.

15. The process of claim 1, wherein said spray-dried product contains from 10 to 15% by weight of said water removable at 130° C.

16. The process of claim 2, wherein said spray-dried product contains from 10 to 15% by weight of said water removable at 130° C.

17. The process of claim 3, wherein said spray-dried product contains from 10 to 15% by weight of said water removable at 130° C.

18. The process of claim 1 wherein said drying gas has an entry temperature of from 170° to 220° C.

19. The process of claim 1 wherein said pressure is from 40 to 65 bar.

* * * * *